US007100192B1

(12) United States Patent
Igawa et al.

(10) Patent No.: US 7,100,192 B1
(45) Date of Patent: Aug. 29, 2006

(54) METHOD OF AND AN APPARATUS FOR CONTROLLING A WEB SERVER, A WEB SERVER CONTROL PROGRAM, AND A STORAGE MEDIUM ON WHICH THE WEB SERVER CONTROL PROGRAM IS STORED

(75) Inventors: Masaru Igawa, Kawasaki (JP); Yoshihiro Takiyasu, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 843 days.

(21) Appl. No.: 09/715,121

(22) Filed: Nov. 20, 2000

Related U.S. Application Data

(63) Continuation of application No. 09/146,517, filed on Sep. 3, 1998, now abandoned.

(30) Foreign Application Priority Data

Sep. 5, 1997 (JP) .................................. 9-240852

(51) Int. Cl.
 *H04N 7/173* (2006.01)
(52) U.S. Cl. ..................... 725/112; 725/91; 725/93; 725/98; 725/121; 709/217; 709/219
(58) Field of Classification Search ........ 709/217–219, 709/223, 226, 229, 231; 725/86–87, 91–93, 725/109, 114–117, 144, 145, 146, 121, 112, 725/98
See application file for complete search history.

(56) References Cited

U.S. PATENT DOCUMENTS 5,852,721 A * 12/1998 Dillon et al. ................ 709/217

| 5,918,020 | A  |   | 6/1999  | Blackard et al. |
|-----------|----|---|---------|-----------------|
| 5,956,716 | A  | * | 9/1999  | Kenner et al. ................ 707/10 |
| 6,078,961 | A  | * | 6/2000  | Mourad et al. ............. 709/235 |
| 6,157,809 | A  | * | 12/2000 | Kambayashi ................ 725/91 |
| 6,378,130 | B1 | * | 4/2002  | Adams ........................ 725/95 |
| 6,477,579 | B1 | * | 11/2002 | Kunkel et al. .............. 709/229 |
| 6,502,242 | B1 | * | 12/2002 | Howe et al. ................ 725/109 |

FOREIGN PATENT DOCUMENTS

| JP | 09-214935  | 8/1997 |
| WO | WO 97/12486 | 4/1997 |

OTHER PUBLICATIONS

Y. Takeuchi, "Integration of VOD server HYPERMS and WWW", NEC technicla journal, Jul. 30, 1996, vol. 49, No. 7, pp. 251-253. (Japanese language with English translation).

(Continued)

*Primary Examiner*—Ngoc Vu
(74) *Attorney, Agent, or Firm*—Mattingly, Stanger, Malur & Brundidge, P.C.

(57) ABSTRACT

A WEB server includes a control unit for HTTP server, a table of addresses of VOD servers, and a table of identifiers of video data. The control unit accesses these tables, in response to a request from a user of a terminal device for a display of video data, to retrieve therefrom an address of a video server and an identifier of a title of video data related to information on a WEB page accessed by the user, then transfers the address and the identifier to the terminal device. This enables the user of a video-on-demand system to easily obtain video data associated with information on the WEB server.

11 Claims, 14 Drawing Sheets

OTHER PUBLICATIONS

T. Umemura et al., "A Study of Media Expression Technology in Distributed Multimedia Database Systems", The General Conference for the Institute of Electronics, Information and Communication Engineers, Mar. 27, 1997, vol. 1, p. 210. (Japanese language with English translation).

Y. Takeuchi et al, "MMOD and integrated Cybermall System", NEC technical journal, Jul. 30, 1996, vol. 49, No. 7, pp. 162-168. (Japanese language with English translation).

E. Muramoto, "WWW Application Building Tools Walts", NEC technical journal, Jul. 30, 1996, vol. 49, No. 7, pp. 152-156. (Japanese language with English translation).

Nikkei Multimedia, published by Nikkei BP, vol. 1997.1, No. 19.

"Video on Demand", Nikkei Multimedia, published by Nikkei BP, vol. 1997.2 Nol. 20, pp. 110-111.

"A Guide to CGI", p. 36, Eric Hermann, Prentice Hall, 1997, pp. 93-94.

Nikkei Multimedia, published by Nikkei BP, vol. 1997.8, No. 26, p. 68.

"Guide to HTML 3.2", Sachi, p. 263, Libro 1997.

"DAVIC 1.2 Specification", Part 2, Chapter 9-19, 1996, pp. 107-114.

"RFC 790", IETF.

* cited by examiner

| ADDRESSES OF TERMINAL DEVICES | VOD SERVER ADDRESSES IN VOD NETWORK |
|---|---|
| 100.100.0.0 | server1. network1 |
| 101.100.0.0 | server2. network2 |
| 102.100.0.0 | server3. network3 |
| 103.100.0.0 | server4. network4 |
| 104.100.0.0 | server5. network5 |
| 105.100.0.0 | server6. network6 |
| ⋮ | ⋮ |

| INFORMATION ON VOD SERVER ADDRESSES | | | | |
|---|---|---|---|---|
| NAMES OF VOD SERVERS | VOD SERVER No.1 | VOD SERVER No.2 | VOD SERVER No.3 | ••• |
| ADDRESSES OF VOD SERVERS | server1.network1 | server2.network2 | server3.network3 | |
| NAME OF VIDEO DATA — SHOES_1 | dir1/dir2/name1 | dir5/dir6/name3 | dir9/dir10/name5 | |
| CAP_2 | dir3/dir4/name2 | × | dir11/dir12/name6 | |
| WEAR_3 | × | dir7/dir8/name4 | dir13/dir14/name7 | |
| ⋮ | | | | |

| INFORMATION ON VOD SERVER ADDRESSES | | | | |
|---|---|---|---|---|
| NAMES OF VOD SERVERS | VOD SERVER No.1 | VOD SERVER No.2 | VOD SERVER No.3 | ••• |
| ADDRESSES OF VOD SERVERS | 10001 | 10002 | 10003 | |
| NAME OF VIDEO DATA / SHOES_1 | 101 | 201 | 301 | |
| | TCP | UDP | HTTP | |
| | MPEG1 | MPEG2 | MPEG4 | |
| CAP_2 | 102 | × | 302 | |
| | UDP | | TCP | |
| | MPEG1 | | MPEG4 | |
| WEAR_3 | × | 203 | 303 | |
| | | TCP | UDP | |
| | | MPEG1 | MPEG2 | |
| ⋮ | | | | |

| PROTOCOL / METHOD OF COMPRESSION | UDP | TCP | HTTP | ••• | |
|---|---|---|---|---|---|
| MPEG1 | VodApp1 | VodApp2 | VodApp3 | | ~5684 |
| MPEG2 | VodApp4 | VodApp5 | VodApp6 | | ~5685 |
| JPEG | VodApp7 | VodApp8 | VodApp9 | | ~5686 |
| ⋮ | | | | | ~5680 |

5681  5682  5683

METHOD OF AND AN APPARATUS FOR CONTROLLING A WEB SERVER, A WEB SERVER CONTROL PROGRAM, AND A STORAGE MEDIUM ON WHICH THE WEB SERVER CONTROL PROGRAM IS STORED

This is a continuation application of U.S. Ser. No. 09/146,517, filed Sep. 3, 1998.

BACKGROUND OF THE INVENTION

The present invention relates to a method of controlling a WEB server, the method being applied to a video data distributing system using retrieval functions of the WEB.

Protocols utilized on the Internet are comprehensively called World Wide Web (WWW) and servers which transmit information by use of the WWW are called WEB servers. Since WEB servers are operating worldwide, users capable of accessing the Internet can acquire information from such WEB servers. Information available to the users include primarily texts, still pictures, audio data, and video data of a low bit rate less than or equal to about 100 kilobits per second (Kb/s).

Additionally, there have been conducted business activities through the Internet, for example, a system in which each user accesses a WEB server, and selects articles or goods to buy the selected articles on credit using his or her credit card. An example of the system has been described in page 47 of the "Nikkei Multimedia" published from Nikkei BP (Vol. 1997. 1, No. 19).

To use the Internet, it is usually necessary for the user to subscribe to an Internet service provider. Thereafter, the user accesses the Internet service provider via a communication line to communicate with the Internet through the provider.

Attention has been attracted to the video-on-demand (VOD) service in which users can watch video data at any desired point of time. When a user desires a VOD service from a terminal device, the user first accesses the VOD server after powering the terminal device and then is presented with a list of available video data on its display. The user selects, for example, a genre or group of video data to watch so as to finally select one title of video data and then issues a request for the video data to the VOD server. In response to the request, the VOD server sends the required video data to the user. An example of the VOD server has been described in an article "Video On Demand" in pages 110 and 111 of the "Nikkei Multimedia" published from Nikkei BP (Vol. 1997. 2, No. 20).

The Digital Audio Visual Council (DAVIC) stipulating standardization of bi-directional multimedia network services has determined a protocol to distribute digital audio/visual data. The DAVIC published "DAVIC 1.2 Specification" in December 1996. In the Specification, Part 12 "Configuration 4 scenario characteristics" (Chapter 9.19 in pages 83 to 147) describes a stipulation which makes it possible to access WEB servers via the Internet from a terminal device using the VOD for a network having a high throughput.

SUMMARY OF THE INVENTION

When a user requests video data related to information on a page of a WEB server, the video data is distributed from the WEB server in the conventional method. However, it is difficult to obtain in a realtime manner the video data via the Internet at a high bit rate equal to or more than several megabits per second (Mb/s) for the following reasons. That is, it is not the first object of the WEB servers to transmit video data. Moreover, the network throughput is limited in the Internet. Therefore, it is difficult to receive by the terminal device high-quality video data related to WEB information. In consequence, the transfer rate of video data is to be lowered or the user cannot view the video data in the realtime manner. Namely, the video data is once downloaded on a disk of the terminal device to be reproduced at original rate later by the terminal device.

In accordance with DAVIC, the access to the Internet and that to the VOD server are completely independent of each other and there exists no stipulation concerning VOD server information to be kept by the WEB servers. Consequently, there is no way to obtain video data related to WEB server information from a VOD server connected to another network.

It is therefore an object of the present invention to enable the user who receives information from a WEB server to obtain video data related to the information from a VOD server other than the WEB server. For each operation to retrieve video data, the user does not select any item from a menu for the VOD server, namely, the video data can be immediately retrieved in a state in which the information of the WEB server is being checked or inspected.

To achieve the object above in accordance with the present invention, information on VOD server addresses from which the terminal device can receive video data and information on identifiers of video data requested from the terminal device are beforehand kept in the WEB server. Moreover, when a request of display of a WEB page including buttons for retrieving video data is received, the WEB server retrieves an address of a VOD server necessary for the terminal device to receive the distributed video data and an identifier of the video data, and then transfers these items to the terminal device. Alternatively, on receiving a request of distribution of video data from the terminal device, the WEB server retrieves an address of a VOD server necessary for the terminal device to receive the distributed video data and an identifier of the video data and then transfers these items to the terminal device. Alternatively, on receiving a request of distribution of video data from the terminal device, the WEB server transfers a client unit of a VOD system kept therein to the terminal device and the WEB server then retrieves an address of a VOD server necessary for the terminal device to receive the distributed video data and an identifier of the video data transfers these items to the terminal device.

With this provision, when retrieving video data regarding the inspected WEB page, the terminal device receives the address identifying the VOD server and the identifier indicating the video data, and hence it is possible to immediately obtain the video data from the VOD server.

BRIEF DESCRIPTION OF THE DRAWINGS

The objects and features of the present invention will become more apparent from the consideration of the following detailed description taken in conjunction with the accompanying drawings in which:

FIG. 20 is a diagram showing a table of identifiers of video data 5620b in the third embodiment; and FIG. 21 is a diagram showing a list of VM codes 5680.

DESCRIPTION OF THE PREFERRED EMBODIMENTS

Description will be given of a first embodiment in accordance with the present invention.

Figure 1:
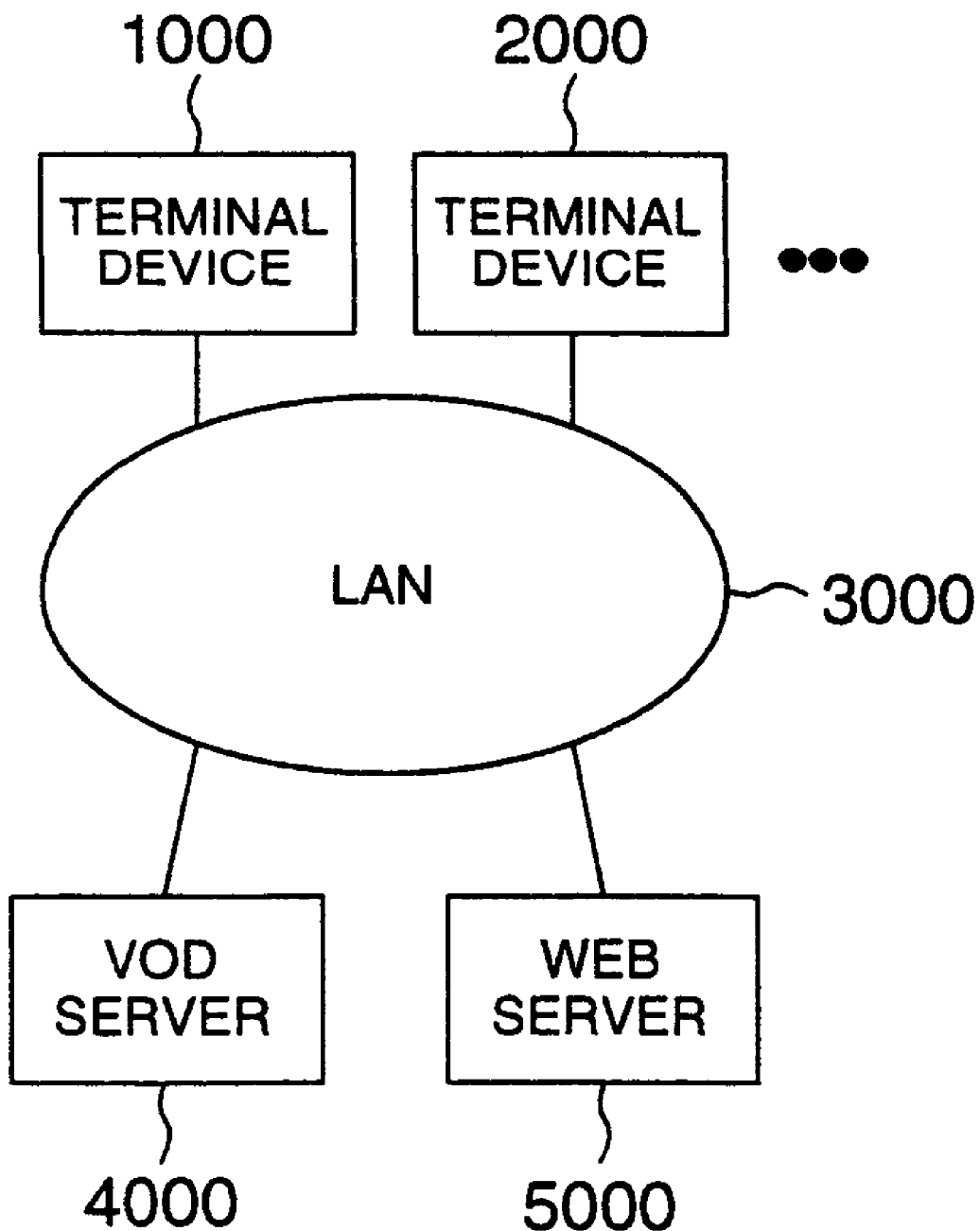
FIG. 1 is a block diagram showing a network environment in a first embodiment in accordance with the present invention.

FIG. 1 shows a network environment to which a method of controlling WEB servers of the present invention is applied. In FIG. 1, terminal devices 1000 and 2000 are connected to a local area network (LAN) 3000 and are capable of accessing a VOD server 4000 and a WEB server 5000 via the LAN 3000.

It is assumed that a manager beforehand stores in the WEB server 5000 information on VOD server addresses and a list of video data in the VOD server. The terminal device 1000 issues a request to the WEB server 5000 for a WEB page 7001 to resultantly acquire the WEB page 7001 shown in FIG. 4. When buttons for retrieving video data 7003 are associated with the WEB page 7001, the WEB server 5000 describes in an HTML file defining a WEB page a VOD server 4000 in which video data is stored and an identifier of video data in the VOD server 4000 and then transfers the WEB page therefrom. When the user selects the buttons for retrieving video data on the WEB page from the terminal device, a request for video data is transferred to the VOD server 4000 through the HTTP protocol. In accordance therewith, the VOD server 4000 distributes the video data to the terminal. The video data is expanded by the terminal device to be audio-visually enjoyed by the user. The HTTP protocol has been described in pages 588 to 602 of the "Netscape FastTrack Server" written by Robert P. Lipshutz and John Garris, Translated into Japanese by Toshihiro Takeuchi, and published from Gijutsu-Hyoro-Sha in 1997.

Assume, for example, that an application of electronic shopping is running on the WEB server 5000. A user views a WEB page of the electronic shopping on a terminal device. In the WEB page, there is provided a button to display video data related to the shopping. When the user selects the button, the terminal device transmits a request for video data to the VOD server 4000 through the HTTP protocol. In accordance therewith, the VOD server 4000 distributes the video data to the terminal device.

Consequently, by selecting the buttons for retrieving video data 7003 displayed on the WEB page 7001, the user can issue a request for video data to the VOD server 4000 without giving special attention thereto to thereby audio-visually enjoy the video data.

Figure 2:
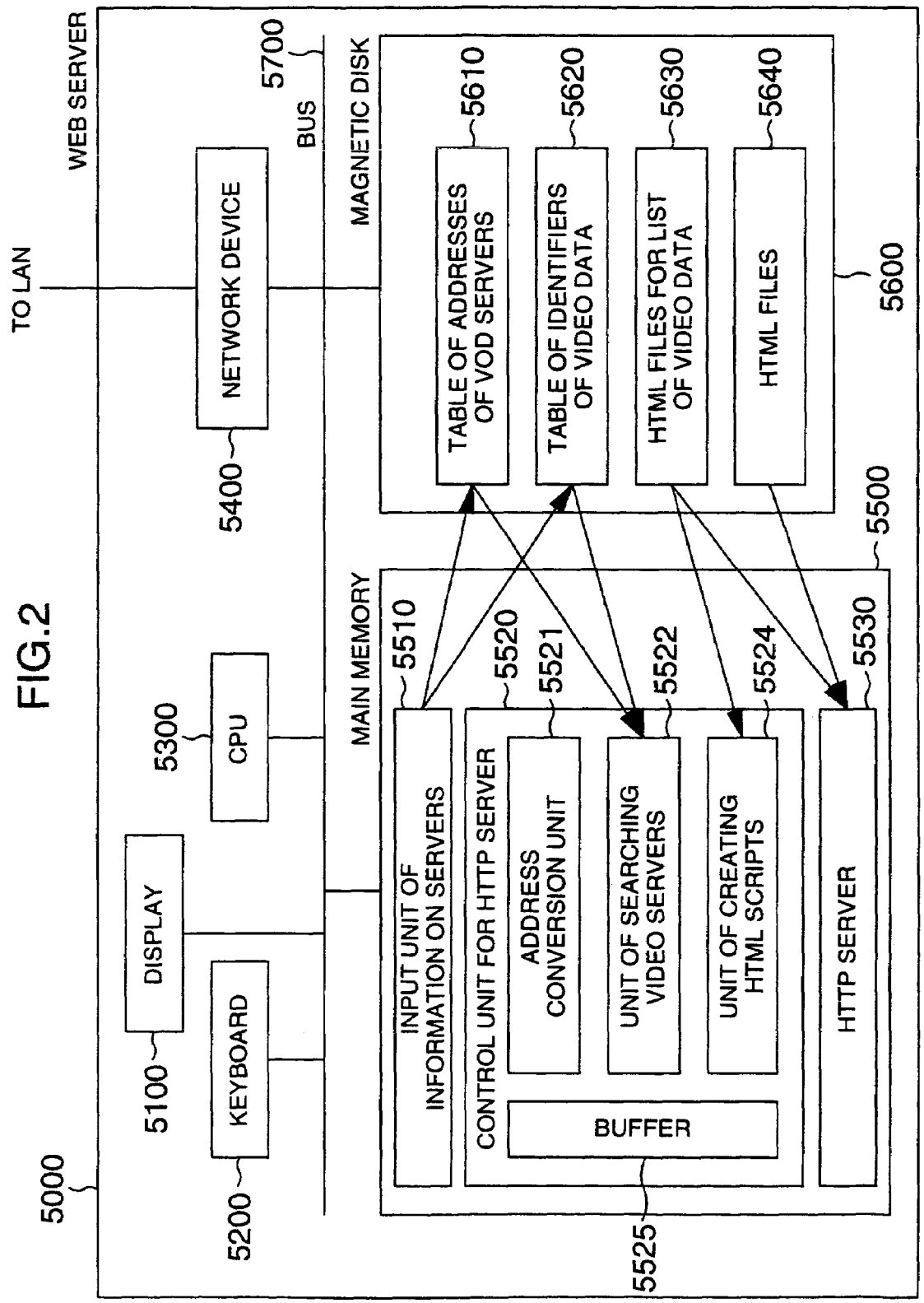
FIG. 2 is a diagram showing the constitution of a WEB server 5000 in the first embodiment.

FIG. 2 shows the construction of the WEB server 5000 of the present invention. The WEB server 5000 includes a display 5100, a keyboard 5200, a central processing unit (CPU) 5300, a network device 5400, a main memory 5500, a magnetic disk 5600, a bus 5700. Loaded in the main memory 5500 are an input unit of information of server 5510, a control unit for HTTP server, and an HTTP server 5530. On the magnetic disk 5600, there are stored a table 5610 of addresses of VOD server 4000, a table of identifiers of video data 5620, Hypertext Markup Language (HTML) files for lists of video data 5630, and HTML files 5640.

The display 5100, the keyboard 5200, the network device 5400, the main memory 5500, and the magnetic disk 5600 are accessed by the CPU 5300 via the bus 5700. The network device 5600 supervises communication of data with the LAN 3000. On receiving a request issued by a user from a terminal device for information through the HTTP protocol, the HTTP server 5530 selects a necessary HTML file from the HTML files and sends the file to the terminal device. The input unit of information on the server is a program having a user interface for the manager of the WEB server 5000 to input data to the table of addresses of VOD server addresses 5610 and the table of identifiers of video data 5620. The control unit for HTTP server 5520 describes information on addresses of the VOD server 4000 in a WEB page. When buttons to retrieve video data exist in the WEB page transferred from the HTTP server to the terminal device, the control unit for HTTP server 5520 retrieves an address of VOD server 4000 in which the video data is stored and an identifier of the data from the table of addresses of VOD servers 5610 and the table of identifiers of video data, and then describes information on the address and the data on the WEB page. Thereafter, the HTTP server 5530 transfers the page to the terminal device.

In an application of electronic shopping, the HTTP server 5530 uses the HTML files 5640 to transfer the WEB page 7001 for the electronic shopping to the terminal device 1000. When there exists a page including buttons to retrieve video data related to articles, the HTTP server 5530 retrieves an address of the VOD server 4000 and an identifier of the video data, describes the address and the identifier in an HTML file 7400, and then transfers these items to the terminal device 1000.

As can be seen from FIG. 2, the control unit for HTTP server 5520 includes an address conversion unit 5521, a unit of searching video servers 5522, a unit of creating HTML scripts 5524, and a buffer 5525. The control unit for HTTP server 5520 is implemented as a CGI program or unit to be activated by the HTTP server 5530 when necessary. In this embodiment, the CGI unit is used to create a new HTML file. The creating procedure has been described in pages 93 to 122 of the "A Guide to CGI" written by Eric Herrmann, translated into Japanese by Teiko Kuno and Yasushi Kuno, and published from Prentice Hall in 1997.

Figure 3:
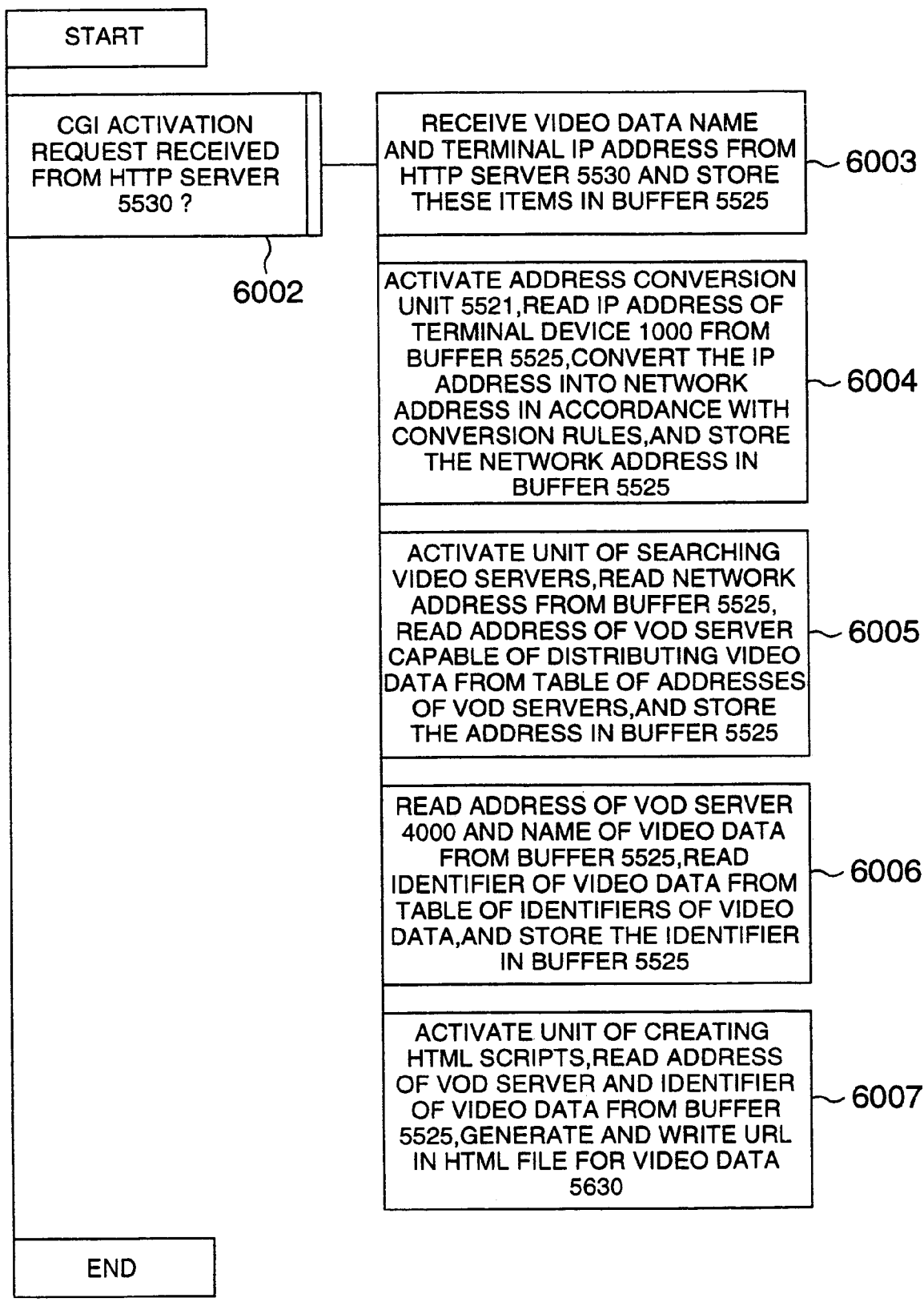
FIG. 3 is a PAD flowchart showing a processing procedure of a control unit for HTTP scripts 5520 in the first embodiment.

Subsequently, the processing procedure of the control unit for HTTP server 5520 will be described by referring to the PAD flowchart of FIG. 3. On receiving an activation request from the HTTP server 5530 (step 6002), the unit 5520 receive an IP address of the terminal device 1000 from the HTTP server 5530. First, the address conversion unit 5521 starts its operation to convert the IP address into a network address (step 6003). Since the network address is stipulated by the Internet Engineering Task Force (IETF) providing standardization of protocols on the Internet, the conversion is achieved in accordance with rules (RFC790 of IETF). The rules will be briefly described below.

Assume that an IP address of a terminal device is expressed by a 32-bit binary number. When the upper-most bit of the number is zero, the bits up to the 23rd bit of the IP address represent a network address. When the upper-most bit of the number is one, the bits up to the 15th bit of the IP address represent a network address. Moreover, when the two upper-most bits are "11", the bits up to the 7th bit thereof indicate a network address. According to this algorithm, an IP address is converted into a network address.

Next, a unit of searching video servers 5522 initiates operation. Using the table of addresses of VOD servers 5610 indicated by the network address temporarily stored in the buffer 5525, the unit 5522 reads an address of a VOD server 4000 to distribute video data to the terminal device and then stores the address in the buffer 5525. Thereafter, the unit 5522 reads again the address of the VOD server 4000 from the buffer 5525 and receives from the HTTP server 5530 a name of video data selected by the terminal device 1000 to obtain an identifier of the video data in the VOD server 4000 in accordance with the table of identifiers of video data for VOD server 5620. As a result, there is obtained the identifier of the video data.

The address of the VOD server 4000 and the identifier of the necessary title in the VOD server are described in the URL format, for example, server1.network1/dir1/dir2/name1 where, server1.network1 specifies a VOD server and dir1/dir2/name1 indicates a name of video data configured and managed in a hierarchic fashion. The control unit for HTTP server 5520 describes the information in the HTML files 5640. The generated HTML file is sent by the HTTP server 5530 to the terminal device.

Figures 4, 5:
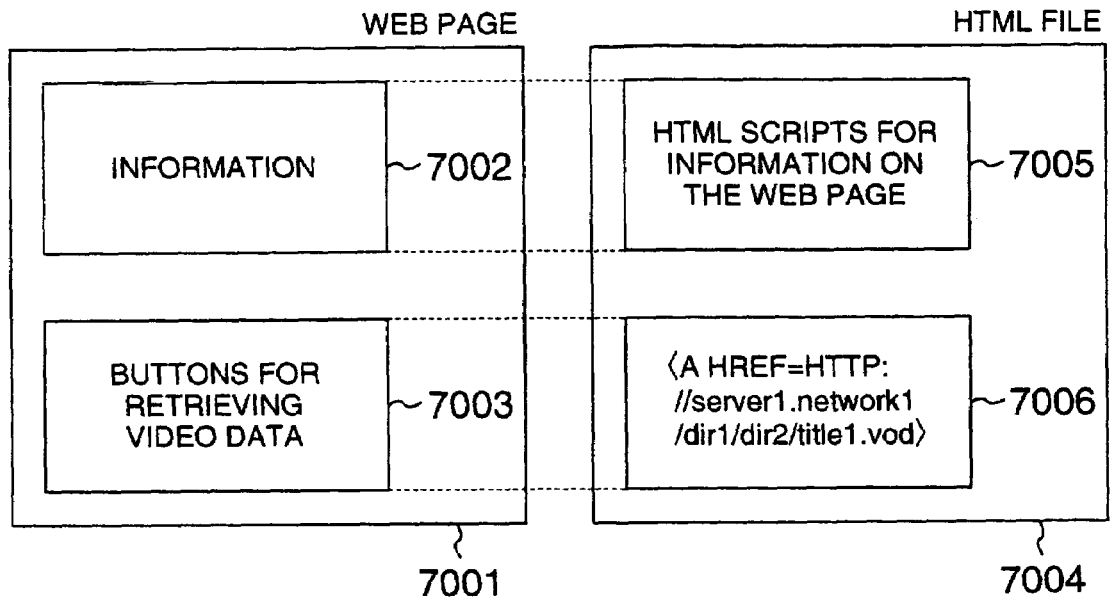
FIG. 4 is a diagram showing a WEB page displayed and contents of description of HTML files in the first embodiment.
FIG. 5 is a diagram showing contents of a table of addresses of VOD servers 5610 in the first embodiment.

The WEB page 7001 sent to the terminal a device in this operation includes information part 7002 and a buttons for retrieving video data part 7003 as shown in FIG. 4. The HTML file 7004 includes, in association with the content the page, a description of information part 7005 and a Description part 7006 of a location of a page to be next referred to when the buttons for retrieving video data are selected. This is described, for example, as follows.

<A HRFF=HTTP://server1.network1/dir1/dir2/title1.vod>

Thanks to this description, when the buttons for retrieving video data are selected, the HTTP server can transmit to the terminal device the WEB page 7001 including the address of the VOD server 4000 and the identifier of video data.

FIG. 5 shows an example of the table of addresses of VOD servers 5610. The table 5610 is used by the unit of searching video servers 5522 to retrieve an address of a VOD server in accordance with a network address of a terminal device. Each record of the table 5610 includes a network address 5611 of a terminal device 1000 and an address of a VOD server 5612 with a correspondence established therebetween. The address of the VOD server 4000 is an address of a server which can distribute video data to a terminal device having the network address. It is assumed that the manager of the WEB server 500 beforehand stores pertinent data in the table 5610 so that the data is accessed for reference in step 6005 of the control unit for HTTP server 5520.

In the storage example of FIG. 5, a network address "102.100.0.0" corresponds to an address of VOD server 400 "server3.network3". Therefore, in step 6005 of the control unit for HTTP server 5520, it is possible to read the address "server3.network3" of the VOD server 4000 to distribute video data to the terminal device having the network address "102.100.0.0".

Figures 6, 7:
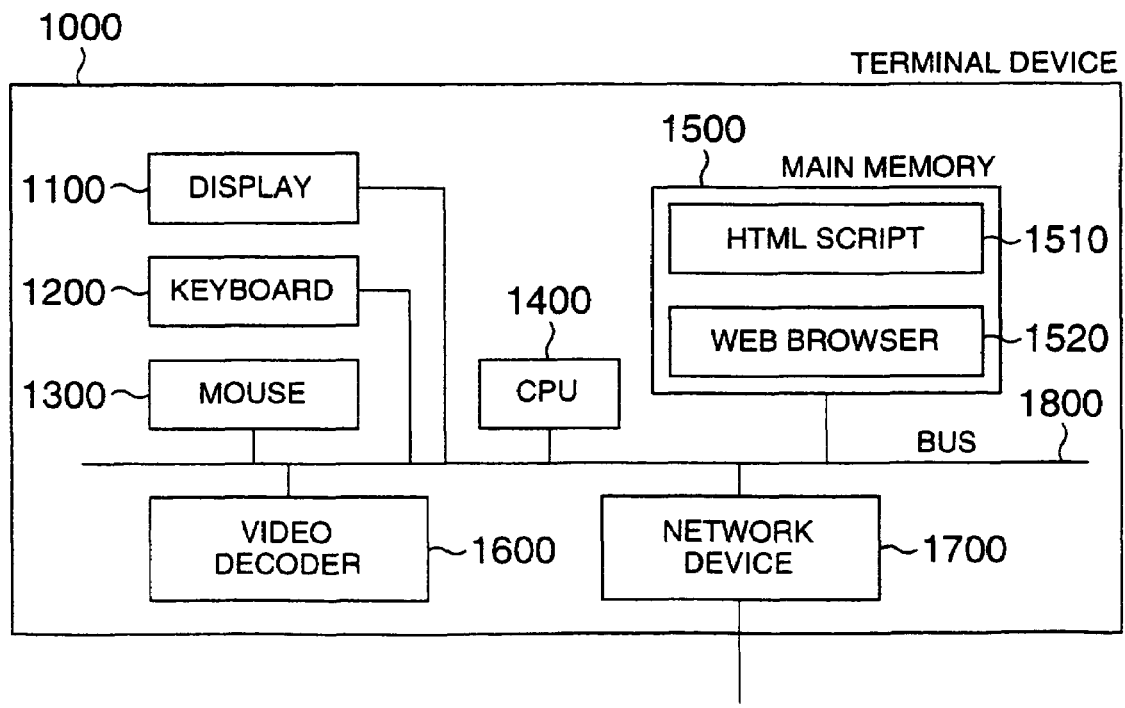
FIG. 6 is a diagram showing a table of identifiers of video data 5620 in the first embodiment.
FIG. 7 is a diagram showing the structure of a terminal device 100 in the first embodiment.

FIG. 6 shows the table of identifiers of video data 5620, which is used by the unit of searching video servers to read information on an identifier of video data in the VOD server 4000. The table 5620 includes a field for name of video data 5621. In this example, in association with video data, there are stored identifiers of video data 5622 to 5624 respectively stored in the VOD servers 1 to 3. Also in this table 5620, the manager of the WEB server 5000 stores pertinent data in advance such that the data is utilized in step 6006 of the control unit for HTTP server 5520 to read an identifier of video data stored in the VOD server.

For example, an identifier of the name of video data "shoes_1" stored in the VOD server 4000 having the address "server1.network1" is obtained as dir1/dir2/name1. Consequently, in step 6006 of the control unit for HTTP server 5520, using the VOD server indicated by the address of VOD server read from the buffer and the video data read from the buffer, the video data identifier "dir1/dir2/name1" is read from the table of identifiers of video data 5620. Additionally, a mark of "x" indicates absence of video data in FIG. 6. Namely, video data of "wear_3" is absent for VOD server 1.

FIG. 7 shows the structure of the terminal device. The device includes a display 1100, a keyboard 1200, a mouse 1300, a CPU 1400, a memory 1500, a video decoder 1600, a network device 1700, and a bus 1800.

The display 1100, the keyboard 1200, the network device 1700, and the main memory 1500 are accessed from the CPU 1400 via the bus 1800. The network device 1700 communicates data with the LAN 3000.

Operating the keyboard 1200 and the mouse 1300, the user issues a request to the WEB server 5000 for a WEB page 7001. A WEB browser 1520 in the memory first issues a request to the WEB server 5000 through the HTTP protocol. Receiving an HTML script from the WEB server 5000, the WEB browser 1520 presents the page on the display 1100. When the buttons for retrieving video data 7003 are present, there exists information on VOD servers added as an attribute by the WEB server. Therefore, when the user selects the buttons 7003, an access is made to the HTTP server on the VOD server 4000 through the HTTP protocol. In accordance therewith, the video data is received from the VOD server 4000 in a realtime fashion. While expanding the video data by the video decoder, the terminal presents the video data on its display.

The VOD server 4000 of FIG. 1 receives a request for distribution of video data through the HTTP protocol. As an example of the VOD server of this kind, there has been known a VOD server called "RealVideo". This server has been described in "RealVideo Capable Of Sending Video Data To One Million People" written in pages 68 and 69 of "Nikkei Multimedia" published from Nikkei BP (Vol. 1997. 8, No. 26).

Figure 8:
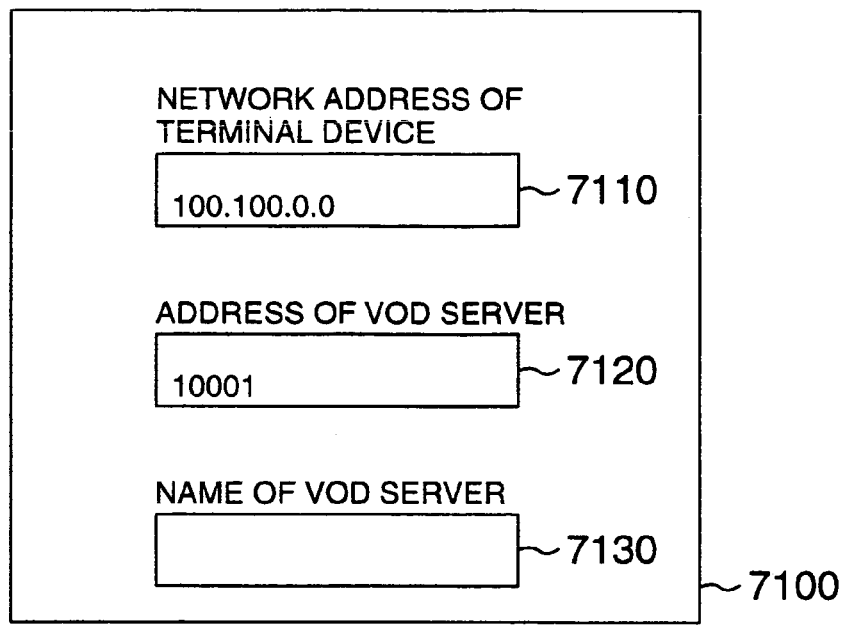
FIG. 8 is a diagram showing a screen image in which the table of addresses of VOD servers 5610 is inputted in the first embodiment.

Finally, description will be given of an example of the user interface screen to input information on a VOD server to the WEB server 5000. FIG. 8 shows a screen image to create a table of addresses of VOD servers 5610. As already described, a network address of a terminal device can be derived from an IP address thereof. A network address of the terminal device is inputted to a field 7110, and an address of a VOD server which can be accessed from the terminal device is inputted to a field 7120. For easy understanding in the operation later, a name of the VOD server is inputted to a field 7130.

Figure 9:
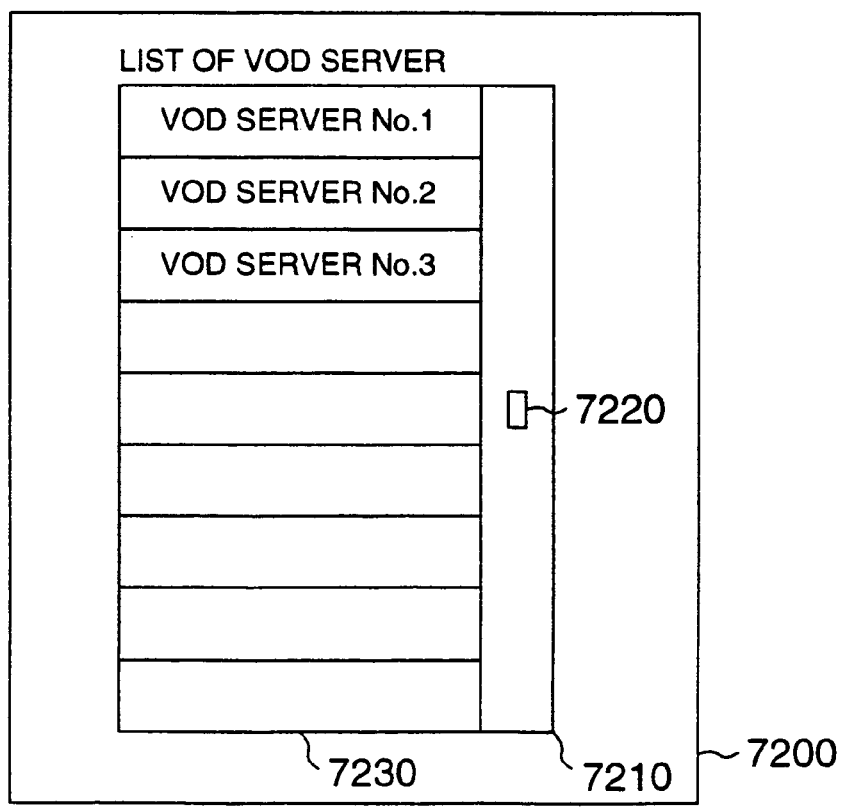
FIG. 9 is a diagram showing a screen image in which a list of VOD servers is displayed in the first embodiment.

FIG. 9 shows an example of a screen image displaying a list of VOD servers inputted as above. Selecting one of the VOD servers therefrom, the user can display a screen image to input identifiers of video data, which will be described later. FIG. 9 includes a button 7220 for the scrolling of the displayed image when a large number of servers are to be displayed, and an area 7210 in which the button 7220 moves.

Figure 10:
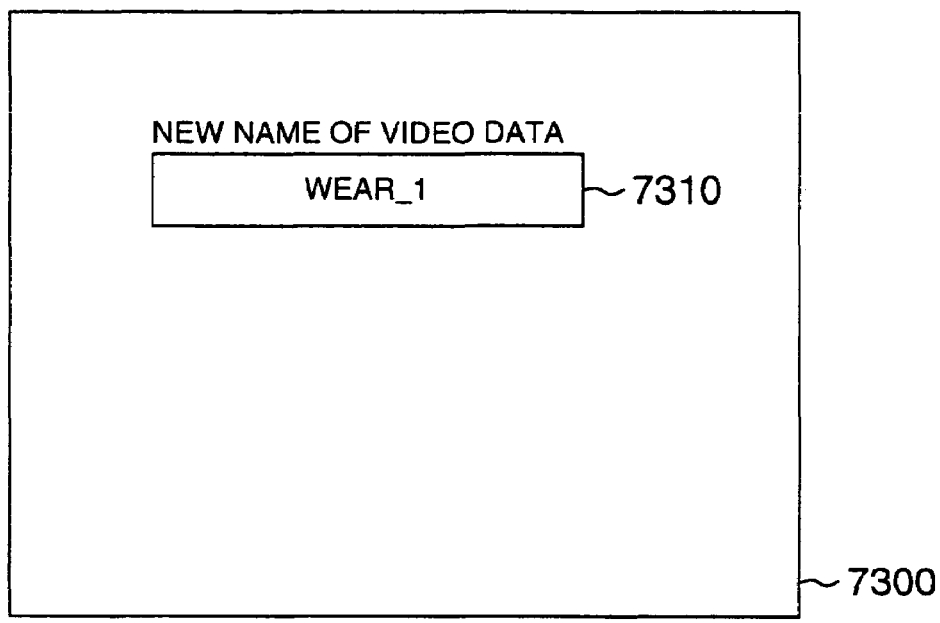
FIG. 10 is a diagram showing a screen image in which a new name of video data is inputted in the first embodiment.

FIG. 10 shows a screen image in which a new name of video data is inputted. When new video data is stored in the VOD server 4000, a name of the video data is inputted in a field 7310.

Figure 11:
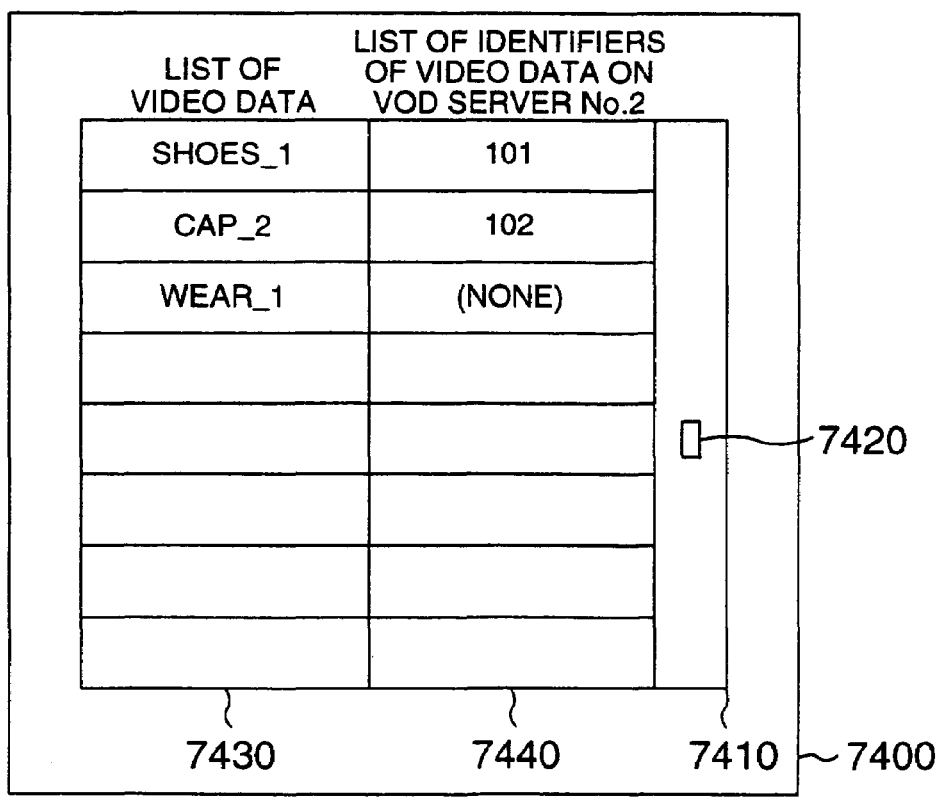
FIG. 11 is a diagram showing a screen image in which the table of identifiers of video data 5620 is inputted in the first embodiment.

FIG. 11 shows a screen image to input the table of identifiers of video data 5620. This diagram includes an area 7430 in which a list of names of video data is displayed and an area in which identifiers of video data possessed by the VOD server selected from the area 7230 of FIG. 9 are inputted. In this example, "VOD server 2" is selected from the area 7230 of FIG. 9. In the area 7440, "none" is displayed in each field thereof. When the VOD server 4000 has video data, the manager inputs identifiers thereof in this area. FIG. 11 further includes a button 7420 for the scrolling of displayed images when a large number of video data are displayed, and an area 7410 in which the button 7420 moves. When items are appropriately inputted in this screen image, there is constructed the table of addresses of VOD servers 5610.

As above, using the WEB server 5000 of the present invention, the user can issue a request for video data to a VOD server capable of conducting VOD distribution immediately after selecting the buttons for retrieving video data on a WEB page displayed on the terminal device 1000. Consequently, the terminal device 1000 can obtain video data with a higher quality from the VOD server.

Next, description will be given of a second embodiment to which the present invention is applied.

In the second embodiment, like the first embodiment, information on addresses of VOD servers and information on identifiers of video data are stored in the WEB server 5000. Differing from the first embodiment in which information on identifiers of the VOD server 4000 and video data are simultaneously transmitted when the menu screen of video data is transferred from Web server 5600 to the terminal device, the information on identifiers of the VOD server 4000 and video data are transferred to the terminal 1000 when the terminal device issues a request for video data in the menu of video data in the second embodiment.

The embodiment is implemented in a network environment similar to that shown in FIG. 1. In the WEB server 5000, the manager beforehand stores information on addresses of VOD server 4000 and a list of video data in the VOD server 4000. The terminal device 1000 has, in addition to the WEB browser 1520, a client unit of VOD system 1530 to reproduce data of video data distributed from the VOD server 4000. When there/are buttons for retrieving video data in the WEB page, the WEB server 5000 creates a file in which an address of a VOD server from which the terminal device can receive distributed video data and an identifier of the video data. When the user selects the buttons for retrieving video data in the WEB page from the terminal device 1000, the WEB server 5000 issues a request to activate the client unit of VOD system 1530 on the terminal device 1000 and transfers the file including information on VOD servers to the WEB browser 1520. In accordance with the information, the WEB browser 1520 immediately issues a request to the VOD server 4000 for video data to thereby obtain the video data.

Figure 12:
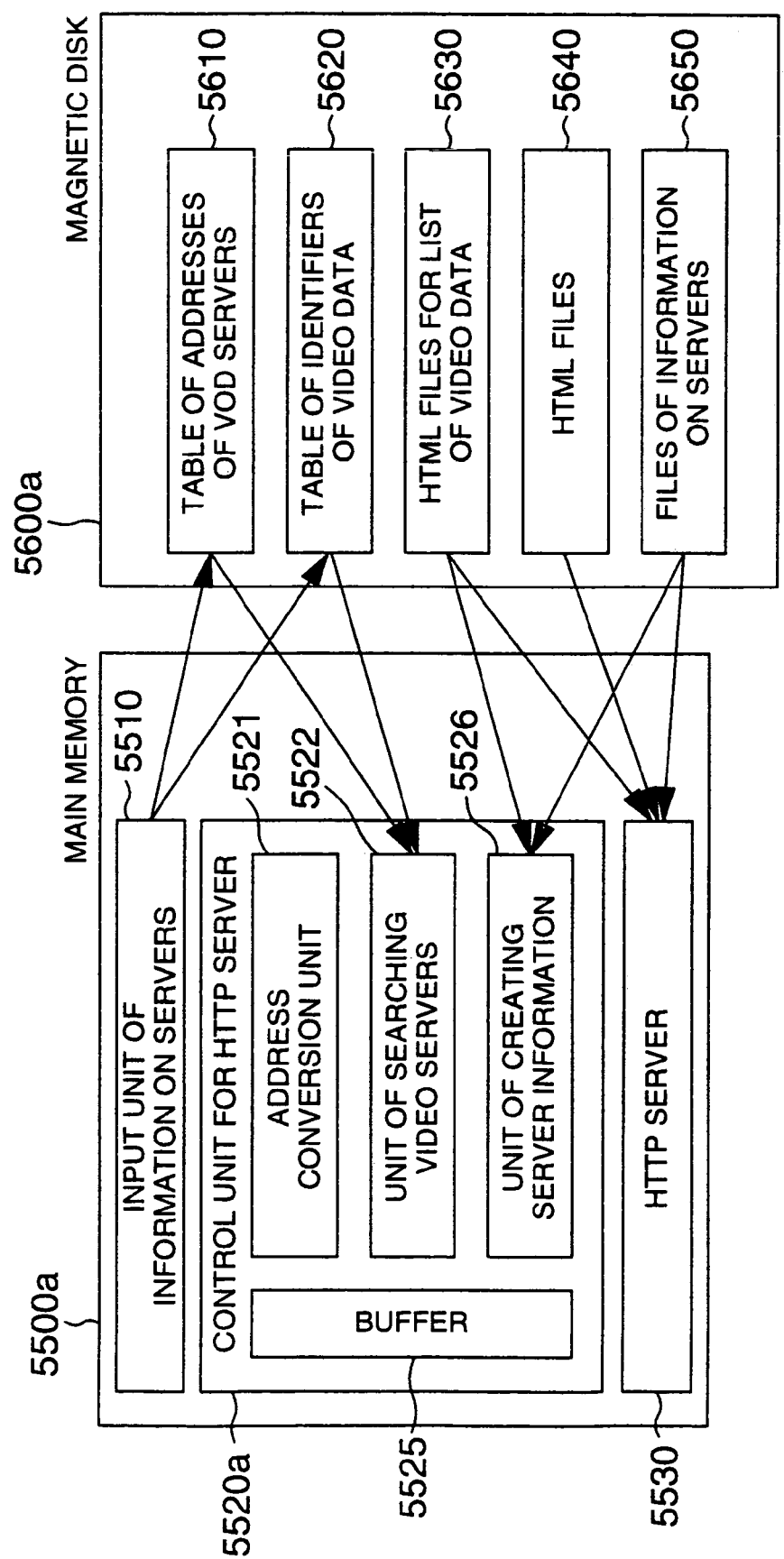
FIG. 12 is a diagram showing the constitution of a WEB server 5000 in a second embodiment.

The structure of the WEB server 5000 of this embodiment differs from that of the WEB server 5000 of the first embodiment in the main memory 5500 and the magnetic disk 5600. As can be seen from FIG. 12, in the main memory 5500*a* of this embodiment, the control unit for HTTP server 5520*a* does not include the unit of creating HTML scripts 5524 and includes a unit of creating server information 5526 in place thereof. Additionally included on the magnetic disk 5600*a* are files of information on servers 5650. The control unit for HTTP server 5520 is implemented, like in the first embodiment, as a CGI program or unit which is activated in response to a request from the HTTP server 5530.

Figure 13:
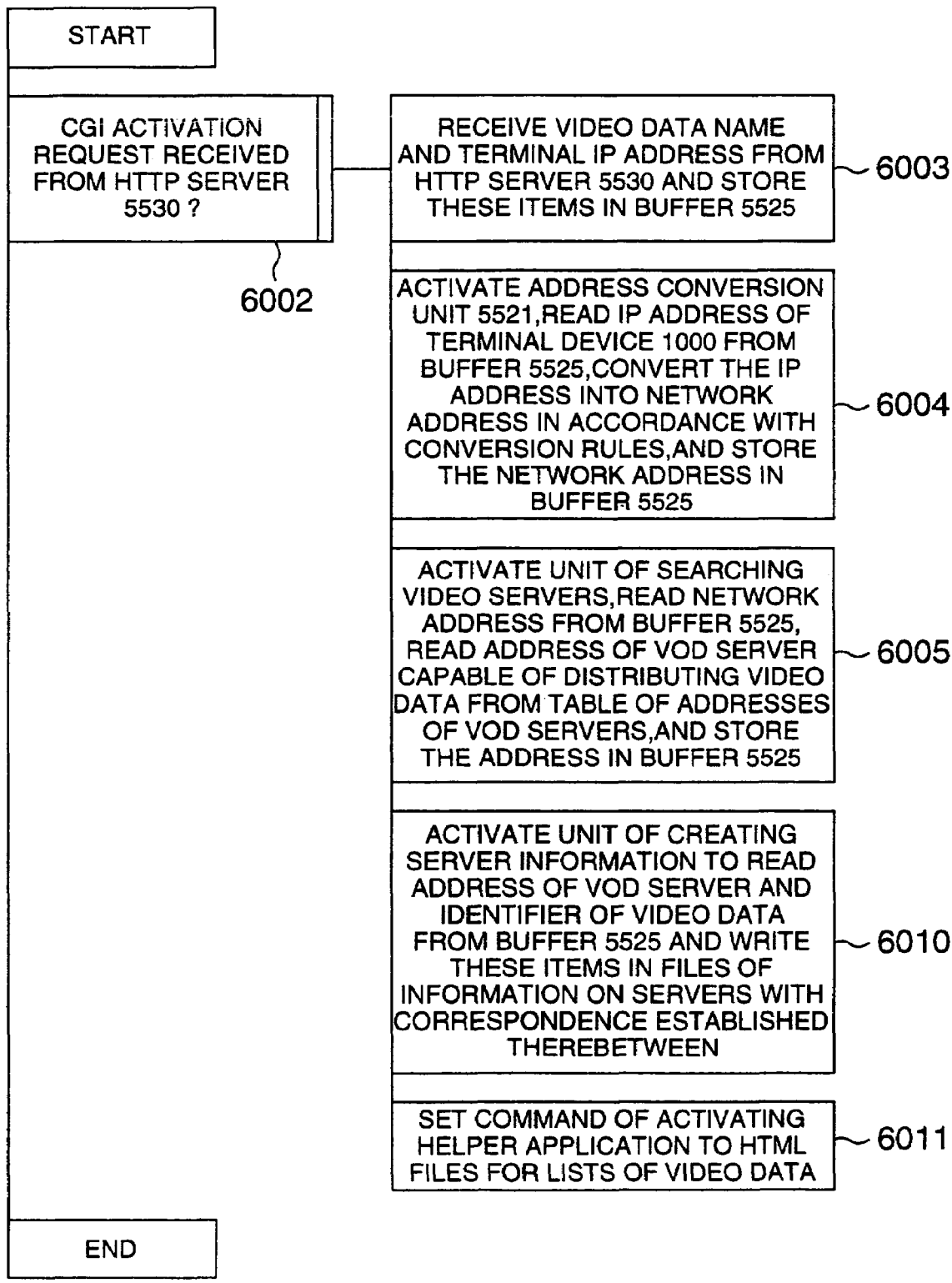
FIG. 13 is a PAD flowchart showing a processing procedure of a control unit for HTTP scripts 5520a in the second embodiment.

Referring to FIG. 13, description will be given of the processing procedure of the control unit for HTTP server 5520*a*. When compared with the first embodiment, steps 6003 to 6005 are kept unchanged. In this embodiment, the unit of creating server information is activated after an address of the VOD server and an identifier of video data are obtained (step 6010). These information items are then written in the files of information on servers 5650.

Figure 14:
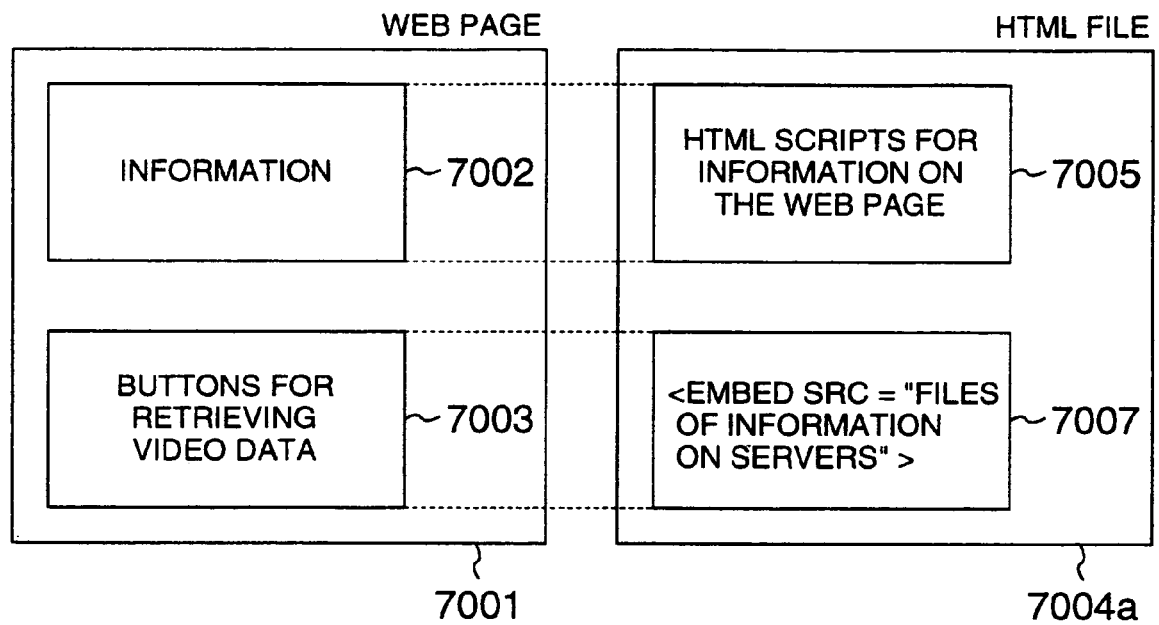
FIG. 14 is a diagram showing a WEB page displayed and contents of description of HTML files in the second embodiment.

In addition, a description indicated by a numeral 7007 in FIG. 14 is stored in a page to be transferred to the terminal device 1000.

<EMBED SCR=VodServerAddressFile> where, VodServerAddressFile indicates the files of information on servers 5650.

This instruction issues an order via the HTTP server 5530 to the WEB browser 1520 in the terminal device 1000 to activate a helper application, which will be described later. When the client unit of VOD system 1530 is beforehand registered as a helper application, the WEB browser 1520 can activate the client unit 1530 when the buttons for retrieving video data 7003 are selected. Additionally, the instruction can order the HTTP server to simultaneously transfer the file of information on servers 5650 to the terminal device. With the information, the terminal device 1000 can request the VOD server 4000 to send video data to the client unit 1530.

Apart from the first embodiment, the address of the VOD server and the identifiers of video data of the second embodiment are not necessarily described in the URL format.

Figure 15:
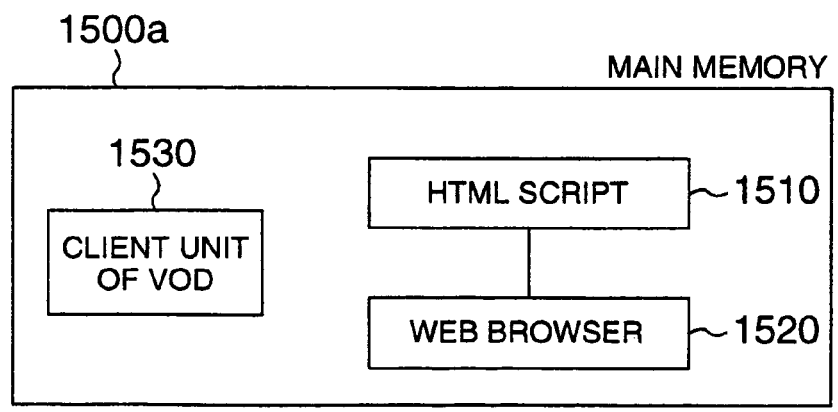
FIG. 15 is a diagram showing program units loaded in a main memory 1500a of a terminal 1000 in the second embodiment.

FIG. 15 shows the layout of the memory 1500 *a* of the terminal device 1000. This embodiment differs from the first embodiment in that there is additionally provided the client unit of VOD system 1530. For the WEB browser 1520, the client unit 1530 is beforehand registered as a helper application. A helper application is an application which can be activated by an order from the WEB server 5000 independently of the WEB browser 1520. When the buttons for retrieving video data 7003 of FIG. 14 are selected, the instruction to activate the helper application is transferred from the HTTP server 5530 to the WEB browser 1520 and then the WEB browser 1520 accordingly activates the client unit of VOD system 1530. Furthermore, the files of information on servers 5650 in which an address of the VOD server 4000 and identifiers of video data are written are transmitted from the WEB server 5000. When activated, the client unit 1530 reads the files of information on servers 5650 and accesses the VOD server 4000 in accordance therewith to reproduce the video data. An actual example of the procedure in which the client unit 1530 accesses the VOD server 4000 to thereby reproduce the video data has been described in pages 110 to 115 of an article "Video On Demand" written in "Nikkei Multimedia" published from Nikkei BP (Vol. 1997. 2, No. 20, 1997).

As described above, when the user selects the buttons for retrieving video data 7003 on the WEB page 7001 displayed on the terminal device 1000 in this embodiment, it is also possible to immediately issue a request for video data to a VOD server capable of distributing the video data. Therefore, the terminal device can obtain video data with a higher quality from the VOD server 4000.

Next, description will be given of a third embodiment in accordance with the present invention.

In the third embodiment, as in the second embodiment, information on addresses of VOD servers and information of identifiers of video data are stored in the WEB server 5000. In the second embodiment, when the terminal device 1000 requests video data selected from the menu of video data, the information on identifications of the VOD server and video data are transferred thereto. In the third embodiment, unlike the second embodiment, when the terminal device 1000 requests video data selected from the menu of video data, a client unit of VOD system 5670 to reproduce video data from the VOD server 4000 is simultaneously sent to the terminal device in addition to the information on identifications of the VOD server and video data.

This embodiment is used in a network environment which is almost the same as that of FIG. 1. In the WEB server 5000, the manager beforehand stores information on addresses of the VOD servers 4000 and a list of video data in the VOD servers 4000. Moreover, a client unit of VOD system 5670 to be activated on the terminal device 1000 is beforehand created in virtual machine (VM) codes to be stored in the WEB server 5000. The WEB page 7001 includes buttons for retrieving video data 7003, and the WEB server 5000 creates a file in which an address of a VOD server from which the terminal device 1000 can receive distributed video data and an identifier of the video data are described. When the user of the terminal device 1000 selects the buttons 7003 on the WEB page 7001, the WEB server 5000 downloads the client unit 5670 of VM codes onto the terminal device 1000 and then transfers information on VOD servers thereto. The terminal device 1000 reads the client unit 5670 in the main memory 1500*b* and activates the unit 5670. Using the information on VOD servers simultaneously received, the terminal device 1000 accesses the VOD server 4000 to request video data.

Figure 16:
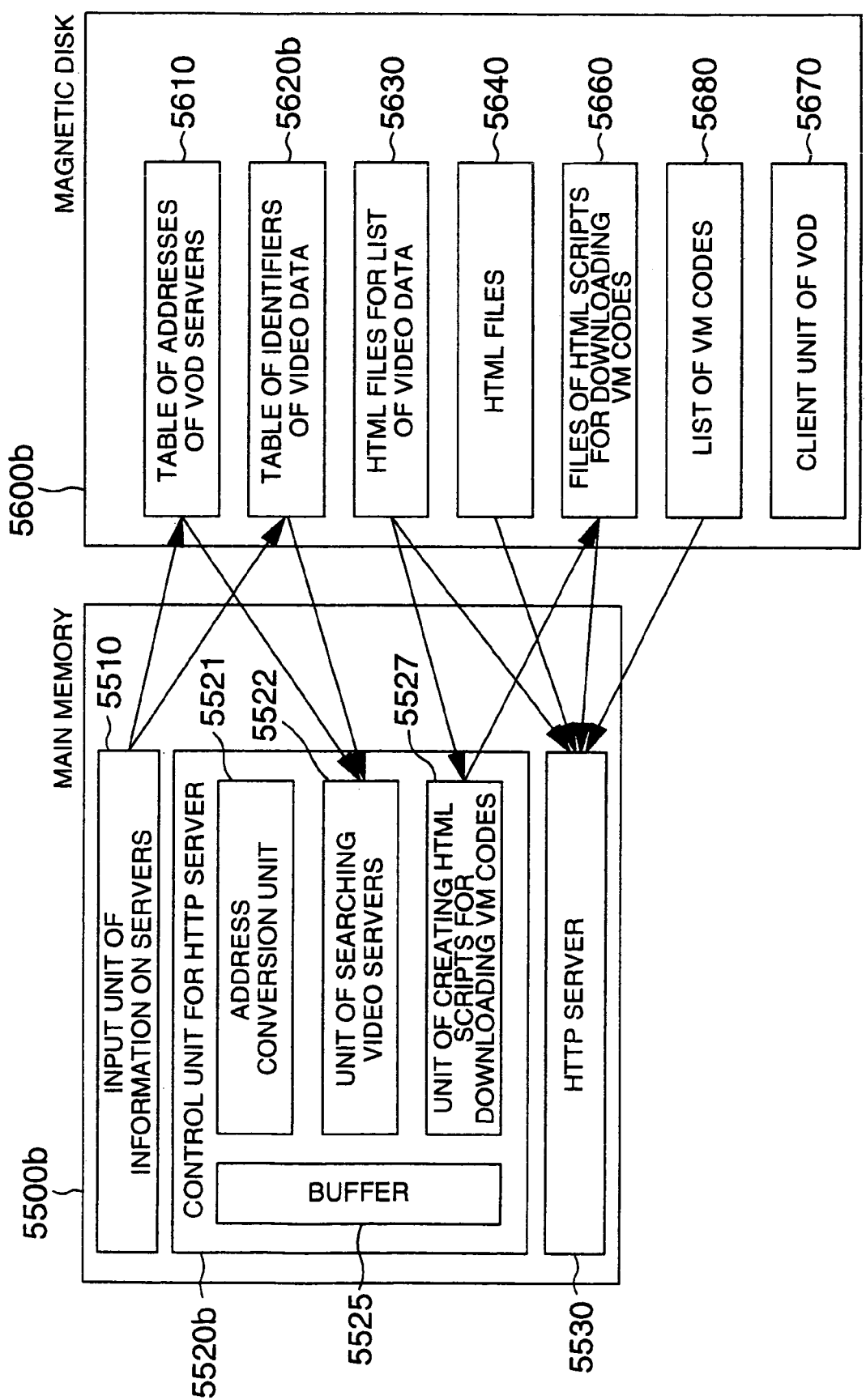
FIG. 16 is a diagram showing structure of a WEB server 5000 in a third embodiment.

The construction of the WEB server 5000 of the embodiment varies from that of the first embodiment in the main memory 5500 and the magnetic disk 5600. As shown in FIG. 16, the main memory 5500*b* of this embodiment does not include the unit of creating HTML scripts 5524 and includes in place thereof a unit of creating HTML scripts for downloading VM codes 5527. Additionally included on the magnetic disk 5600*b* are files of HTML scripts for downloading VM codes 5660 and the client unit of VOD system 5670.

The processing procedure of the control unit for HTTP server 5520*b* will be described by referring to FIG. 17. This unit 5520*b* is also implemented by a CGI unit or program as in the first embodiment. On receiving a request for display of the WEB page 7001 including buttons for retrieving video data 7003, the HTTP server 5530 initiates an instruction to activate the CGI unit. The control unit for HTTP server 5520*b* carries out an activating operation in accordance with the CGI activating instruction (step 6002) and then obtains an IP address of the terminal device as in the first embodiment to obtain an address of the VOD server in accordance with the IP address. The control unit 5520*b* then stores the name of video data and an address of the VOD server in the buffer 5525 (steps 6003 to 6005). Thereafter, in step 6012, the control unit 5520*b* activates the unit of creating HTML scripts for downloading VM codes, reads the address of the VOD server and the name of video data from the buffer 5525, and reads an identifier of video data, a protocol, and a method of compressing video data from the table of identifiers of video data 5620*b*.

In this configuration, the table 5620*b* is a table in which identifiers of video data which can be distributed from the respective VOD servers are kept as shown in FIG. 20. Furthermore, the table 5620*b* keeps therein protocols to distribute video data and methods of compressing video data. In the example of FIG. 20, for example, video data "shoes 1" kept in the VOD server 1 is associated with an identifier of 101, a protocol of TCP, and a video data compression method of MPEG1.

Figure 17:
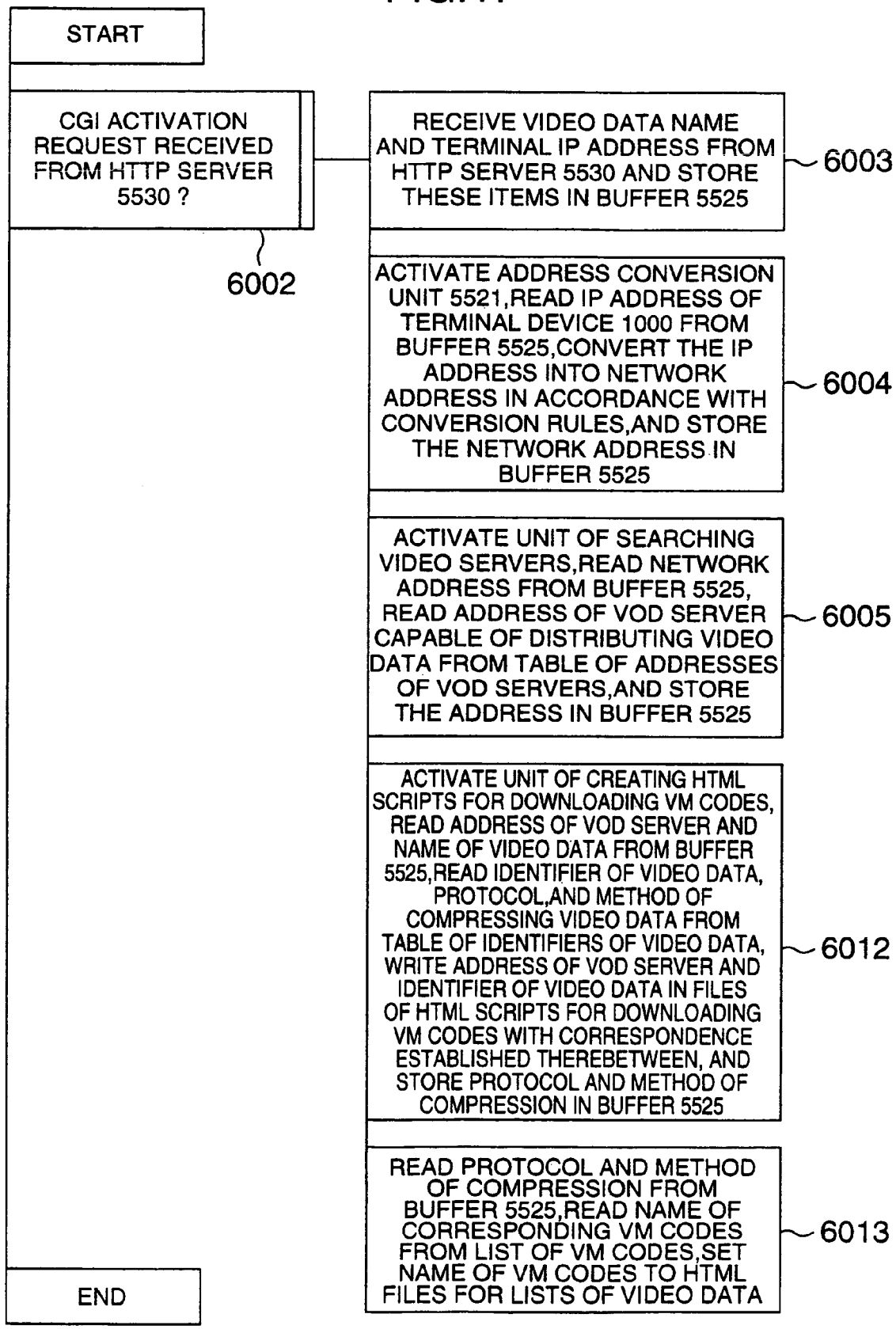
FIG. 17 is a PAD flowchart showing a processing procedure of a control unit for HTTP scripts 5520b in the third embodiment.

Return to description of the procedure or step 6012 of FIG. 17. The control unit for HTTP server 5520*b* writes in the files of HTML scripts for downloading VM codes 5660 the address of the VOD server read from the buffer 5525 and the identifier of video data obtained from the table of identifiers of video data 5620*b* with a correspondence established therebetween.

In step 6013 of FIG. 17, in accordance with the protocol for distributing video data and the method of compressing video data obtained from the table 5620*b*, the control unit 5520*b* selects VM codes necessary to reproduce the video data by use of a list of VM codes 5680 to set the VM codes to the HTML files for lists of video data 5630. In this embodiment, the list of VM codes 5680 is a table to keep therein VM codes serving as a client unit of the VOD system corresponding to a protocol and a method of compression. For example, when the protocol is "UDP" and the compression method is "MPEG1", the table indicates that "VodAppl" is required to be employed as the client unit of VOD system.

By referring to FIG. 17, description has been given of the procedure in which the unit of creating scripts of VM codes 5527 reads the name of video data and the IP address of the terminal device to create the files of HTML scripts for downloading VM codes 5660 and the HTML files for lists of video data 5630. Depending on the environment of the VOD server to which the terminal device belongs, the network throughput is limited, and accordingly, it is necessary to change the protocol available for the distribution of video data from the VOD server and the method of compressing the video data. The control unit for HTTP server 5520*b* can select VM codes in association with the protocol and the compression method and hence advantageously minimized the size of VM codes to be downloaded onto the terminal device.

Figure 18:
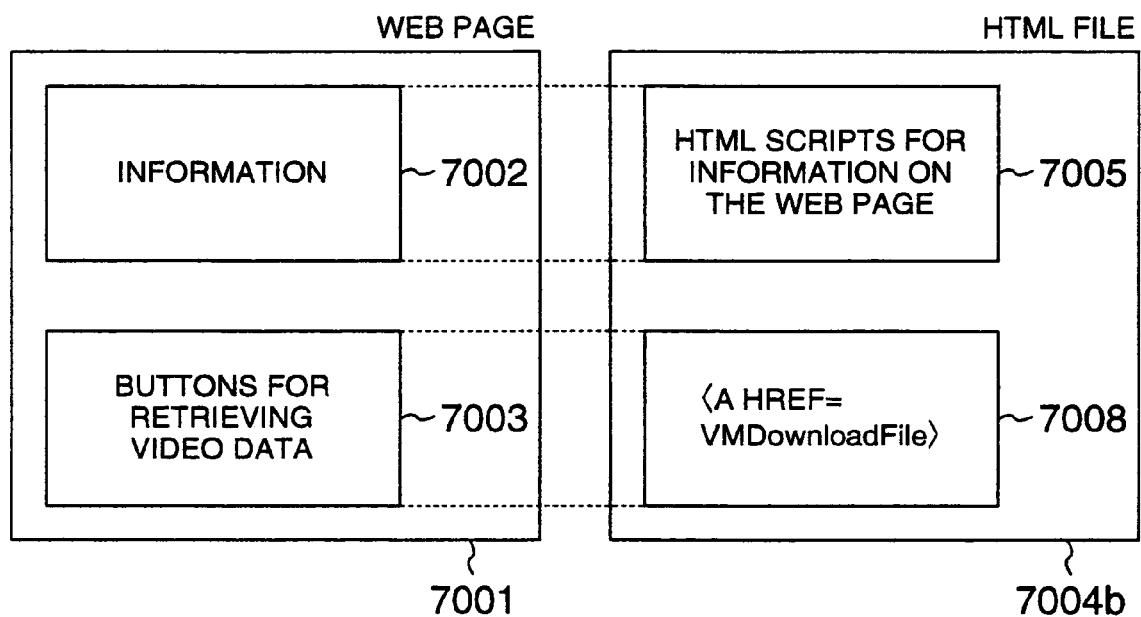
FIG. 18 is a diagram showing a WEB page displayed and contents of description of HTML files in the third embodiment.

Subsequently, description will be given of a method of describing the files of HTML scripts for downloading VM codes 5660 and the HTML files for lists of video data 5630. In the WEB page 7001 of FIG. 18, there is disposed an area 7008 corresponding to the buttons for retrieving video data 7003, the area 7008 including description of an instruction used to download VM codes when the buttons for retrieving video data 7003 are selected. The description is as follows.
<A HREF=VMDownloadFile>
where, VMDownloadFile indicates the files of HTML scripts for downloading VM codes 5640.

In the specified files, there are described as initial values of the client unit of the VOD system the addresses of VOD servers and descriptors of video data in addition to download instructions. When JAVA is selected for the VM codes, the files are described as follows.
<APPLET CODE="VodApp.class"WIDTH=300 HEIGHT=200>
<PARAM NAME="VodServerAddress"VALUE="10001">
<PARAM NAME="TitleID" VALUE="101">

The first line is an instruction to download and activate a program file (VodApp.class) of the client unit of VOD system 5660. The second and third lines indicate an instruction to incorporate address "10001" of the VOD server and identifier "101" of the video data in the program during the downloading phase. The downloading method of JAVA has been described in pages 263 to 266 of the "Guide to HTML3.2" written by Sachi and published from Libros in 1997.

Differing from the first embodiment, the address of VOD servers and identifiers of video data of this embodiment are not necessarily described in the URL format.

Figure 19:
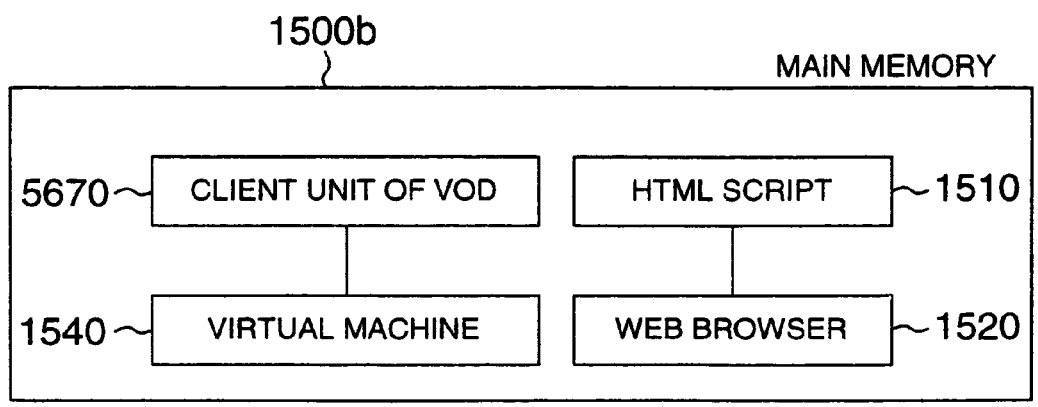
FIG. 19 is a diagram showing program units loaded in a main memory 1500b of the terminal 1000 in the third embodiment.

The memory 1500b of the terminal device varies from that of the second embodiment in that there is added a virtual machine 1540 as shown in FIG. 19. The user first issues by the WEB browser 1520 a request for display of the WEB page 7001 to the WEB server 5000. In response thereto, the WEB server 5000 sends the HTML files for lists of video data 5630. Receiving the HTML files, the WEB browser 1520 displays the WEB page 7001. When the WEB page 7001 includes buttons for retrieving video data 7003 and the user selects the buttons, the WEB server 500 transfers a client unit of VOD system 5670 described in VM codes thereto. The client unit 5670 is activated on the virtual machine 1540. At the same time, the WEB server 5000 transfers to the terminal device 1000 an address of the VOD server 4000 keeping video data therein and an identifier of the video data. In the terminal device 1000, the client unit 5670 in VM codes can immediately request video data necessary for the VOD server 4000 in accordance with information on addresses of VOD servers.

In this embodiment as described above, when the buttons for retrieving video data are selected on the WEB page 7001 displayed on the terminal device 1000, a request for video data can be immediately issued to the VOD server 4000 capable of distributing video data. Therefore, the terminal device can obtain video data with a higher quality from the VOD server 4000.

In accordance with the present invention, the user who is accessing the WEB server can immediately issue a request for highly precise video data associated with information obtained from the WEB server to a video server different from the WEB server so as to audio-visually enjoy the video data.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A video data distributing system, comprising:
   a plurality of video servers, each storing video data;
   a controller connected with the plurality of video servers and a plurality of terminals via a network, wherein each of the terminals is arranged to send a video data request, including a first video data identifier for uniquely identifying the video data, to the controller;
   wherein the controller includes storing means and control means, and the storing means is arranged to store:
      a video data information table including the first video data identifier, a video server identifier, and a second video data identifier, linked with one another, the video server identifier identifying one of the video servers having the video data identified with the first video data identifier and used for accessing the identified video server, and the second video data identifier identifying the video data in the identified video server and indicating a location of the video data in the identified video server, and
      a video server information table including a terminal identifier identifying a terminal and the video server identifier of the identified video server having the video data to be distributed to the terminal, linked with each other;
   wherein the controller, upon receiving the video data request, obtains the video server identifier corresponding to the terminal identifier of the terminal originating the video data request from the video server information table, extracts the second video data identifier from the video data information table using the obtained video server identifier and the first video data identifier in the video data request, and data sends the video server identifier and the second video identifier to the terminal originating the video data request; and
   wherein the terminal originating the video data request accesses the identified video server with the received video server identifier, and obtains the video data from the identified video server using the received second video data identifier.

2. A video data distributing system according to claim 1, wherein the first video data identifier is a serial number.

3. A video data distributing system according to claim 1, wherein the first video data identifier is a unique video name.

4. A video data distributing system according to claim 3, wherein said second video data identifier is a file name in the video server.

5. A video data distributing system according to claim 1, wherein the video server identifier includes a URL of the video server.

6. A video data distributing system according to claim 1, wherein the video server identifier and the second video data identifier constitute at least a part of a URL.

7. A video data distributing system according to claim 6, wherein the terminal identifier is at least a part of an IP address of the terminal originating the video data request.

8. A video data distributing system according to claim 1, wherein the video data information table further includes transmission information of each video data, and wherein the controller sends the transmission information to the terminal originating the video data request with the video server identifier and the second video data identifier, such that the terminal originating the video data request can select a program to receive and reproduce the video data sent from the video server in accordance with the transmission information.

9. A video data distributing system according to claim 8, wherein the transmission information includes information on a network protocol used for sending and receiving the video data.

10. A video data distributing system according to claim 8, wherein the transmission information includes information on a file format of the video data.

11. A video data distributing method performed in a system including a plurality of video servers, a plurality of terminals, and a web server connected with the plurality of video servers and terminals via a network, the method comprising the steps of:

preparing, in the web server, a video data information table including a first video data identifier for uniquely identifying video data, a video server identifier, and a second video data identifier, linked with one another, the video server identifier identifying one of the video servers having video data identified with the first video data identifier and used for accessing the identified video server, and the second video data identifier identifying the video data in the identified video server and indicating a location of the video data in the identified video server;

preparing, in the web server, a video server information table including a terminal identifier identifying a terminal and the identified video server identifier of the video server having the video data to be distributed to the terminal, linked with each other;

sending a video data request including the first video data identifier from one of the plurality of terminals to the web server;

obtaining, in the web server, the video server identifier corresponding to the terminal identifier of the terminal originating the video data request from the video server information table, and extracting the second video data identifier from the video data information table using the obtained video server identifier and the first video data identifier in the video data request, to send the video server identifier and the second video data identifier to the terminal originating the video data request, and accessing, by the terminal originating the video data request, the identified video server with the received video server identifier, and obtaining the video data from the identified video server using the received second video data identifier for reproduction.

* * * * *